United States Patent [19]

Hambley

[11] Patent Number: 5,019,259

[45] Date of Patent: May 28, 1991

[54] FILTER UNDERDRAIN APPARATUS WITH PARTITIONED DISTRIBUTOR CONDUITS

[76] Inventor: John B. Hambley, 4232-16A Street S.E., Calgary, Alberta, Canada, T2G 3V1

[21] Appl. No.: 365,904

[22] Filed: Jun. 15, 1989

[51] Int. Cl.⁵ .............................................. B01D 24/12
[52] U.S. Cl. .................................... 210/274; 210/275; 210/279; 210/293; 239/549
[58] Field of Search ............... 210/232, 274, 275, 293, 210/541, 279, 285, 289, 291, 410, 411; 239/549, 552, 553, 556, 561

[56] References Cited

U.S. PATENT DOCUMENTS

| 1,773,417 | 8/1930 | Whitacre | 210/293 |
| 2,710,692 | 6/1955 | Kegel et al. | 210/274 |
| 3,110,667 | 11/1963 | Stuppy | 210/275 |
| 3,956,134 | 5/1975 | Sturgill | 210/279 |
| 4,065,391 | 12/1977 | Farabaugh | 210/293 |
| 4,118,322 | 10/1978 | Sanroman | 210/274 |
| 4,196,079 | 4/1980 | Ward | 210/274 |
| 4,331,542 | 5/1982 | Emrie | 210/293 |

FOREIGN PATENT DOCUMENTS

| 669712 | 1/1939 | Fed. Rep. of Germany | 210/293 |
| 1153346 | 8/1963 | Fed. Rep. of Germany | 210/332 |
| 298867 | 1/1952 | Switzerland | 210/293 |
| 123152 | 2/1919 | United Kingdom | 210/274 |
| 2002251 | 2/1979 | United Kingdom | 210/293 |

Primary Examiner—Robert A. Dawson
Assistant Examiner—Joseph Drodge
Attorney, Agent, or Firm—William R. Hinds; George H. Dunsmuir

[57] ABSTRACT

A filter underdrain apparatus comprises plate means forming a plurality of horizontal distributor conduits, the conduits being in juxtaposed, laterally-spaced relationship and constructed and arranged to defined alternating conduits and troughs of a filter underdrain. At least some of the horizontal distributor conduits include interior partitions extending along such conduits and dividing the interior of each such conduit into a liquid passage and a gas passage. Liquid metering orifices communicate the interior of the liquid passage with the exterior of the distributor conduit for substantially evenly distributing backwash liquid flows from the liquid passage and for passing filtered liquid flows into the liquid passage. Gas metering orifices communicate the interior of the gas passage with the exterior of the distributor conduit for substantially evenly distributing gas from the gas passage when connected with a pressurized gas source. A screen arrangement may be included to screen the liquid and gas orifices from filter media exterior of the distributor conduits, and the screen may comprise perforate grids. The perforate grids may extend across the troughs between adjacent distributor conduits.

18 Claims, 13 Drawing Sheets

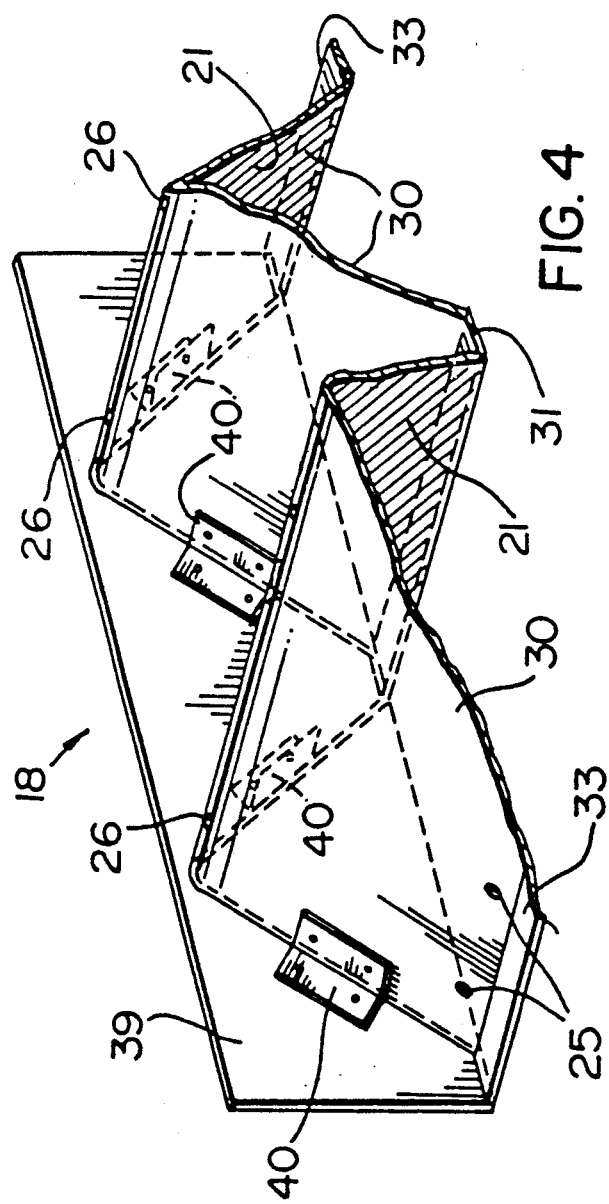
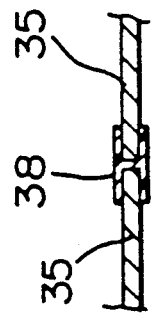
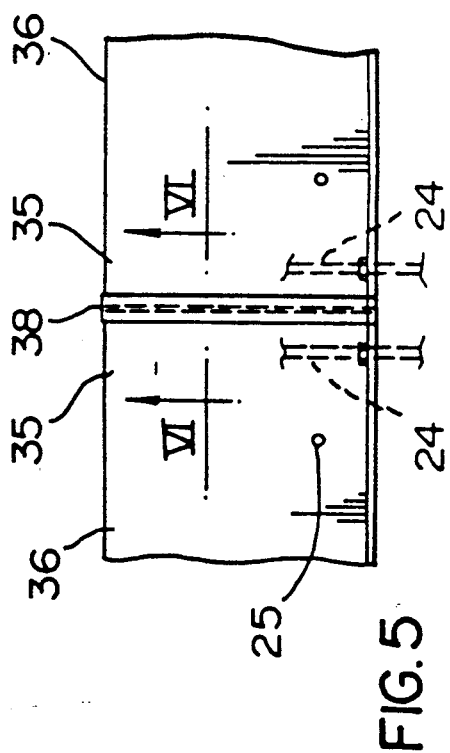

FILTER UNDERDRAIN APPARATUS WITH PARTITIONED DISTRIBUTOR CONDUITS

BACKGROUND OF THE INVENTION

This invention relates to a filter underdrain apparatus.

Filter underdrain apparatuses are by no means new. Examples of such apparatuses are found in U.S. Pat. Nos. 2,873,857, which issued to J. L. Schied on Feb. 17, 1959; 3,189,181, which issued to J. S. Couse on June 15, 1965; 3,247,971, which issued to R. F. Kastler on Apr. 16, 1966; 3,313,420, which issued to A. A. Hirsch on Apr. 11, 1967; 2,615,019, which issued to F. J. Early, Jr., on Oct. 26, 1972; 3,762,559, which issued to M. G. Knoy et al on Oct. 2, 1973; and 3,968,038, which issued to D. H. Nilsson on July 6, 1976.

In general, underdrain apparatuses or systems of the type disclosed by the prior art possess series flaws, including non-uniform or uneven backwash distribution which occurs because of the momentum of the water passing through a perforated header or channel. Water at a high velocity across an orifice will not be discharged through the orifice as readily as it will when flowing at a lower velocity across the orifice. Other problems include structural failures because the underdrain system is not sufficiently strong or securely anchored to resist the large upward thrust generated during a backwash operation.

Some underdrains are expensive to purchase and many are difficult and expensive to install and require tedious grouting procedures or cumbersome and expensive false bottom structures. Channelling and jetting and spouting bed action in the filter media occurs in many strainer type designs. Many underdrains have no ability to cope with trapped air which on explosive release is very disruptive in filters particularly those with gravel bedding. Many underdrains lack the flexibility to operate in the air scour assisted backwash mode or air scour simultaneous with backwash. Some types of underdrains, for example those of tile or porous tile, are quite fragile and much breakage during installation results. Inadequate corrosion resistance is a factor with some underdrains. Many types of underdrains require gravel layering as an inflexible requirement. Thus, in spite of the large number of different apparatuses or systems presently available, there is still much room for improvement in the filter underdrain field.

The object of the present invention is to meet the above need by providing a relatively simple filter underdrain apparatus, which substantially reduces the likelihood of most or any of the above mentioned problems being encountered.

While the term filter underdrain is used throughout for brevity, the application of the invention is not restricted by any means to filters only. There are various types of water/waste and process equipment that are not filters at all but where improved flow collection and backwash distribution would be most desirable. Examples of such equipment, and this list is by no means intended to be all encompassing, are:
upflow or downflow contact clarifiers or filters
activated carbon contactors
ion exchange units
iron removal units - greensand/catalyzed sand/birm
catalyst bed contactors, e.g. desilicizers
neutralizing media contactors Thus the term filter underdrains is used and understood to include units other than true filters.

In some process equipment vessels (upflow mode filters and contact clarifiers as examples) the underdrain serves a somewhat different function that in downflow, i.e. it serves to distribute incoming service flow as well as backwash.

Backwash in filters is clearly defined as a periodic reverse flow through the media to flow out trapped impurities. The term is used in ion exchange and carbon contactors as well, but means a somewhat different thing. In filters dirt is flushed from the bed by backwash. In ion exchange and carbon contactors, and the like, water is typically filtered in advance so backwash serves to "fluff up the bed" to eliminate packing and flow channelling so that contact is improved and short circuiting averted in carbon contactor units. In ion exchanger a "backwash" is required to wash any dirt from the bed, but more to "fluff the bed" so that regenerant contact is maximized, i.e. regenerant short circuiting avoided.

BRIEF SUMMARY OF THE INVENTION

The present invention relates to a filter underdrain apparatus comprising plate means shaped and configured to form a plurality of horizontal distributor conduits, the conduits being in juxtaposed, laterally-spaced relationship and constructed and arranged to define alternating conduits and troughs of a filter underdrain, at least some of the horizontal distributor conduits including interior partition means extending along such conduits and dividing the interior of each such conduit into a liquid passage and a gas passage, means defining liquid metering orifices communicating the interior of the liquid passage with the exterior of the distributor conduit for substantially evenly distributing backwash liquid flows from the liquid passage and for passing filtered liquid flows into the liquid passage, and means defining gas metering orifices communicating the interior of the gas passage with the exterior of the distributor conduit for substantially evenly distributing gas from the gas passage when connected with a pressurized gas source. Preferably in each such conduit the gas passage is above the liquid passage, the gas metering orifices are above the partition means, and the liquid metering orifices are below the partition means. Preferably screen means are provided for screening the liquid and gas orifices from filter media exterior of the distributor conduits, which screen means may comprise perforate grid means, and which perforate grid means may extend across the trough between adjacent distributor conduits.

BRIEF DESCRIPTION OF THE DRAWINGS

While the arches and troughs are described as being inverted "V" and "V-shaped", it will be appreciated that the sides and vertices of the arches and troughs can be rounded.

The invention will be described in greater detail with reference to the accompanying drawings, which illustrate preferred embodiments of the invention, and wherein:

FIG. 4 is a perspective view of one end of a portion of the filter element of FIG. 3;

FIG. 5 is a schematic, side elevational view of a joint between two sections of the filter element;

FIG. 6 is a cross section taken generally along line VI—VI of FIG. 5;

DESCRIPTION OF THE PREFERRED EMBODIMENT(S)

Figure 1:
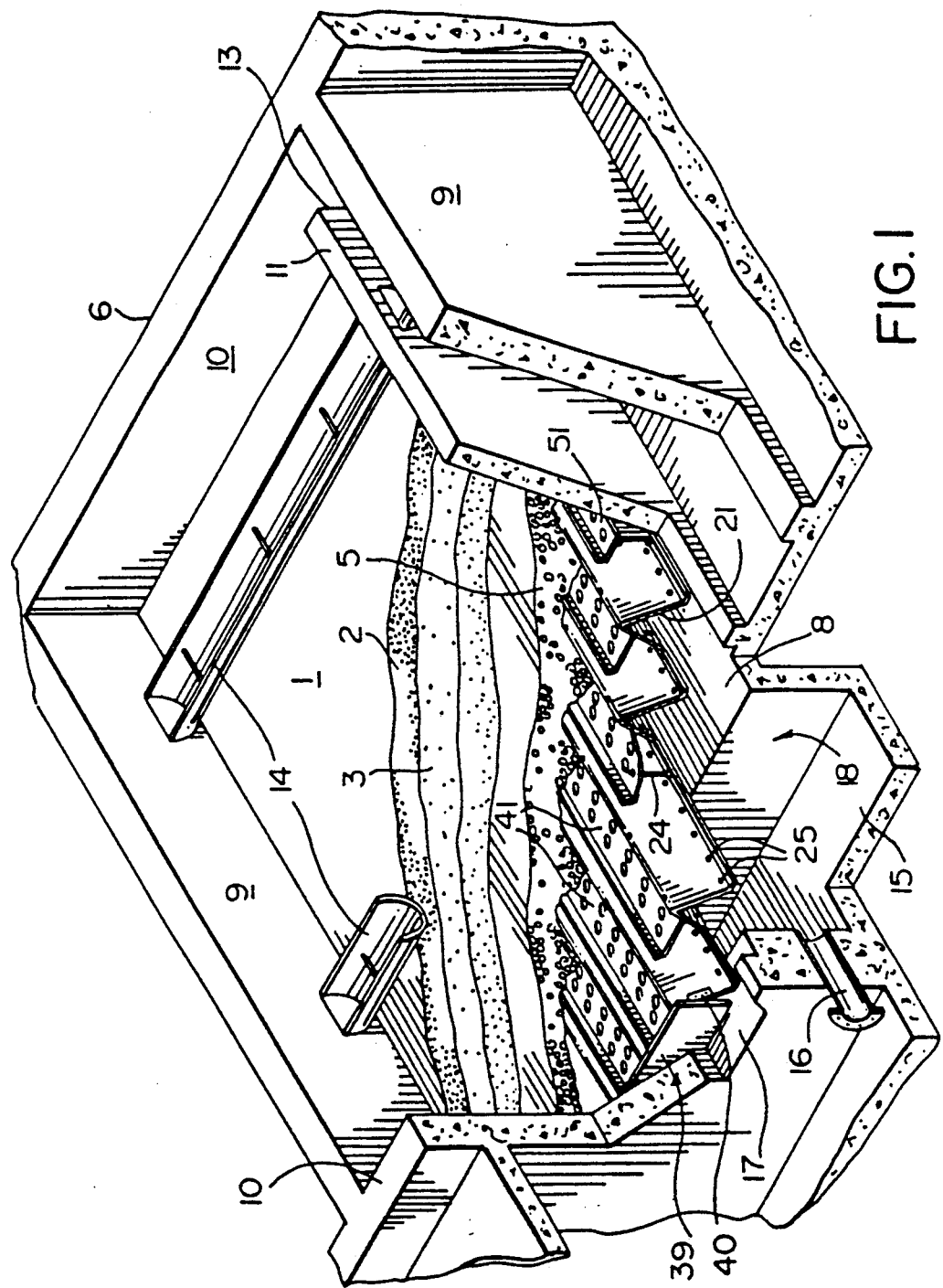
FIG. 1 is a schematic, perspective, partly sectioned view of a common type of filter tank or basin incorporating an apparatus in accordance with the present invention.

With reference to FIG. 1, the filter underdrain apparatus of the present invention is shown with a bed 1 of filter media of the type which includes a top layer 2 of anthracite coal followed by a layer 3 of sand, several layers of progressively coarser gravel, and a base layer of coarse gravel. The mode illustrated is water backwash only.

It should be clearly understood that the configuration and type of filter media shown in FIG. 1 are for illustration only. The underdrain has important embodiments where for example no support gravel layering is required, (in fact, a gravel-less design is very frequently preferable) and is applicable and flexible to suite the wide variety of materials which are used as filter media.

Commonly, filters do incorporate a top layer of anthracite over a layer of fine sand as shown in FIG. 1. Many filters operate with no anthracite layer. Many filters incorporate a layer of fine heavy material such as garnet or wilmenite under the filter sand. On occasion filters operate with other materials entirely for example coke, magnesium oxide, activated carbon, etc.

The underdrain apparatus is not restricted by any means to the layering shown for illustration in FIG. 1.

The apparatus and the bed 1 are located in a concrete, open top tank or basin 6, which is defined by a bottom slab 8, side walls 9 and end walls 10. A partition 11 parallel to one side wall 9 defines an overflow trough or gullet 13 for receiving backwash water from semicylindrical metal, concrete or fiberglass troughs 14, which extend transversely of the basin 6 above the bed 1.

A transversely extending trough or flume 15 is provided in the bottom of the basin 6 at one end thereof for receiving filtering and backwash water. Filtered water is discharged from the flume 15 via a pipe 16, which is also used to introduce backwash water into the basin 6. A shoulder or ledge 17 is provided at the outer end of the flume 15 for supporting end of filter elements generally indicated at 18.

It should be again clearly understood that FIG. 1 is for illustration only of one type of filter. Other configurations are common and the underdrain apparatus is readily adaptable to these. Examples of varied configurations:

transversely extending trough or flume or embedded pipe across the centre width, with filter outflow and backwash inlet at the side.

trough or flume or embedded pipe running the length of the filter down the center line, or along one side, or externally down one side. In these cases the troughs and channels of the underdrain apparatus run transversely.

circular filters with cross diameter inlet/outlet flume or trough or embedded pipe with the underdrain apparatus running transversely to such flume or trough or embedded pipe.

Frequently the side gullet 13 of FIG. 1 is across the end of the filter with backwash troughs 14 of FIG. 1 then running the length of the filter. The plethora of drawings required to illustrate such variations is not considered essential to this application.

Figure 2:
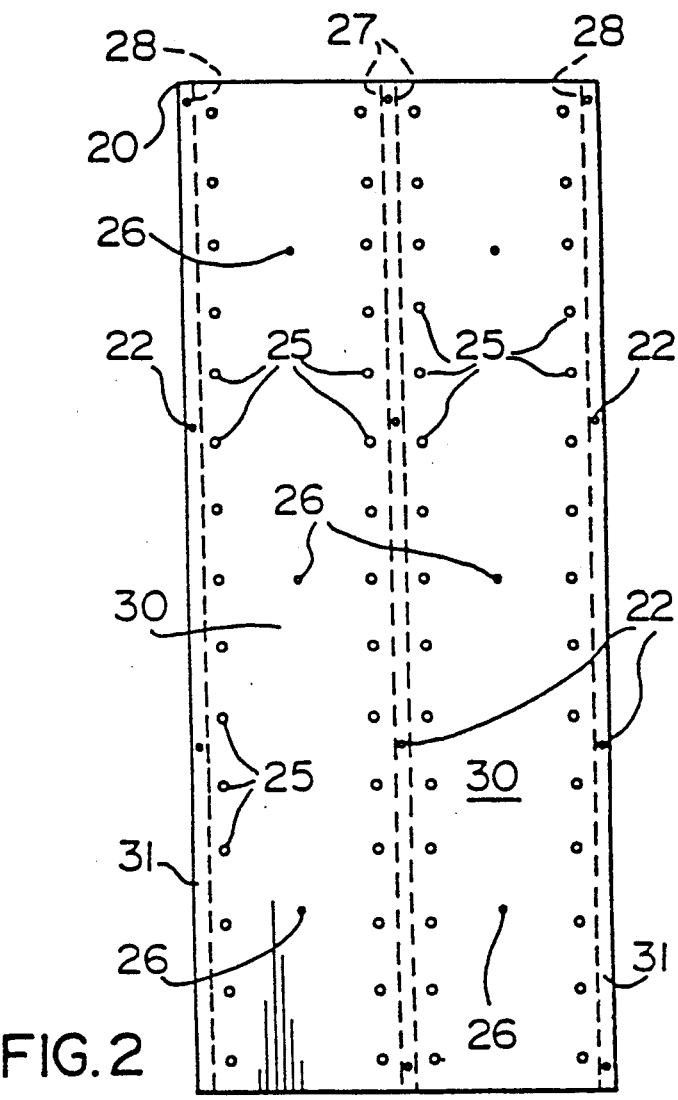
FIG. 2 is a plan view of a panel or plate used to form a filter element for use in the apparatus of the present invention.
Figure 3:
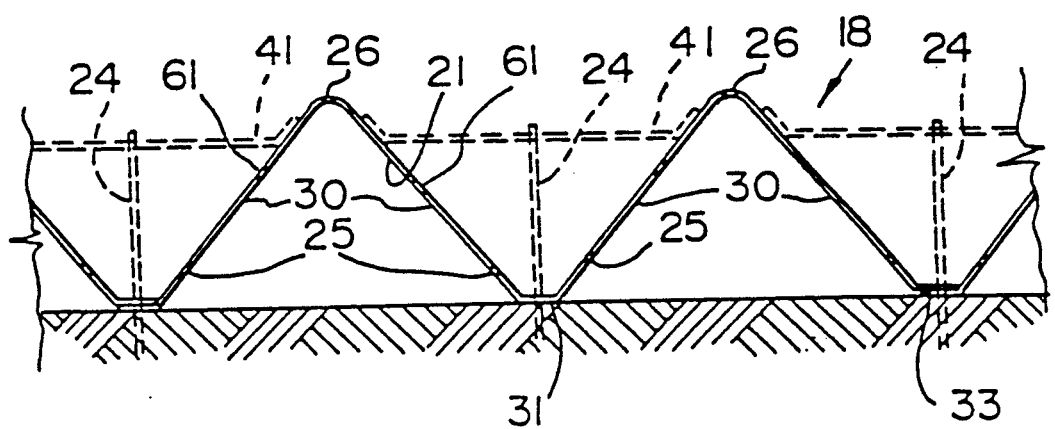
FIG. 3 is a schematic, cross-sectional view of a portion of a filter element in accordance with the present invention.

The filter elements 18 include a first set of elongated, rectangular plates 20 (FIG. 2), which are bent to an inverted V-shape to define arches 21 (FIGS. 1, 3 and 4). Starting with a flat sheet of stainless steel (usually 304), holes 22 for receiving anchor bolts 24, water inlet and drain holes 25, and air vent holes 26 are punched through the sheet. The sheet dimensions are typical 4' by 10', with a thickness determined by the circumstances. The sheet is bent along lines 27 and 28 to form the sloping sides 30 of the arches 21 and the bases 31 of the troughs therebetween. While two arches 21 are formed in the same sheet, a narrower sheet can be used and often would be used to form a single arch. The bases at the outer edges of the sheet are defined by flanges 33, which overlap similar flanges on adjacent sheets (FIGS. 3 and 4) to form a plurality of parallel arches alternating with troughs. It is normally not necessary to provide a seal between overlapping flanges 33. However, when conditions warrent such a seal, the seal can be a strip of rubber or other elastomeric material. The filter elements are installed on the bottom slab 8 of the basin 6 before the bed 1 of the filter media, and are secured to such bottom wall 8 by the bolts 24.

In order to avoid drilling through steel when installing the apparatus on concrete reinforced with steel, single arches with flanges on each side thereof are used. The arches are positioned with gaps between the flanges of adjacent arches and a cross-bar with an anchor bolt therein is used to bridge the gap between adjacent flanges, and to connect the arches to the concrete so that the bolt misses the reinforcement.

An important feature of the invention relates to the sizing of the water inlet/outlet orifices 25 in the inverted V-shaped arches. In the embodiments shown, the orifices 25 vary in diameter along the length of the inverted V-shaped arch conduits to compensate for the velocity and momentum changes in the backwash flow. Water flowing at high velocity across an orifice will not be discharged through such orifice as readily as when flowing at a lower velocity across another orifice of the same diameter. What occurs in a conduit having uniformly sized orifices or lateral connections along the length is a maldistribution of the backwash flow so that the far end of the conduit remote from the inlet end passes more flow than the inlet end. Such maldistribution is common in many types of underdrains and is very disruptive. The key to the design of this filter underdrain apparatus is to vary the size of the orifices 25 so that the coefficient of flow discharge through each orifice is the same. The variation in orifice diameter is calculated for each filter on a custom design basis, such calculation taking into consideration the variable of flow velocity entering and along the conduit, fluid viscosity and density allowable pressure drops through the orifices and along the conduit, orifice spacing centerline to centerline and desired maximum maldistribution required. The proper orifice size spacing and variable in diameter thus calculated is then used in the fabrication of plates shown in FIGS. 2, 14 and 15.

For the air scour mode the orifices 25 are compensated for in the calculation for the water which passes through the air distribution holes on backwash. For the simultaneously backwash air scour mode of operation where the conduit is divided by the plate 68 (FIGS. 16 and 17) into an upper air passage 71 and a lower water passage 70, orifice sizes 25 are calculated based on actual flows in the passage 70. Side conduit orifices are made slightly larger than all the others to compensate for the somewhat greater area of filter media subtended.

Thus, the inverted V-shaped arched conduits or passages are fabricated with varying orifice size to insure essentially no maldistribution along the conduit length.

The size and distribution of the air and water holes makes it expensive and difficult to produce the holes by drilling, particularly by stacked plate drilling. The holes are readily made by a computerized punch press. No specific gauge of stainless steel is considered to be standard, this being a function of the shape, structural configuration, and the required factors of safety to withstand the various pressure fluctuations or forces to which the underdrain will be subjected.

A variety of materials could be used to fabricate this underdrain. For example: steel (painted or galvanized), aluminum, fiberglass, various type of plastics and fiber reinforced plastics, concrete, etc. The material preferred for the great majority of installations is 304 or similar grade stainless steel because of its corrosion resistance properties and great strength. However, stainless steel is difficult to drill, machine and weld so the underdrain was designed so that fabrication would be by punching and bending and assembly by bolting, with the use of seal strips as necessary, thus eliminating or minimizing any requirement for drilling, tapping, machining, welding, etc.

Figure 7:
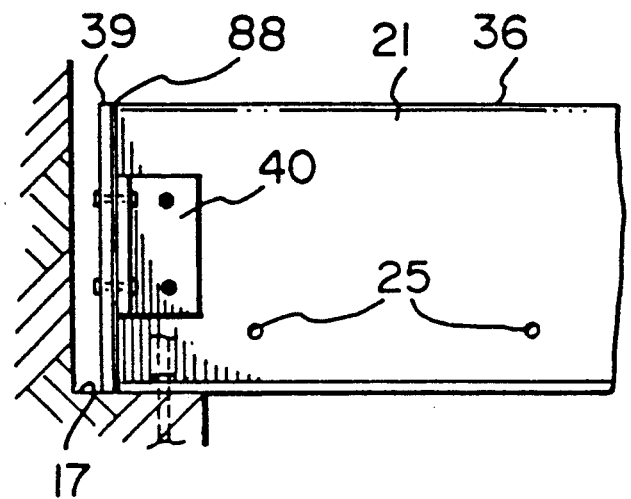
FIG. 7 is a side elevational view of one end of the filter element of FIGS. 3 and 4.

Referring to FIGS. 5 and 6, the junctions between the ends 35 of aligned sections 36 of filter elements are sealed by flexible strips 38 of generally H-shaped cross section. The ends of the arches 21 are closed by rectangular end plates 39 with seals 88 (FIG. 7) of generally C-shaped cross section, of neoprene or other elastomer, between the sections and the plates. Corner brackets 40 of L-shaped cross section are used to connect the sections 36 to the end plates 39 by bolting. Referring to FIGS. 1, 3 and 8 to 11, the top end of each trough between adjacent arches 21 is closed by an elongated grid 41 defined by a rectangular plates with a plurality of openings 42 therein, and inclined side edges 44 for connecting the grid to the sloping sides 30 of the arches 21.

Figure 8:
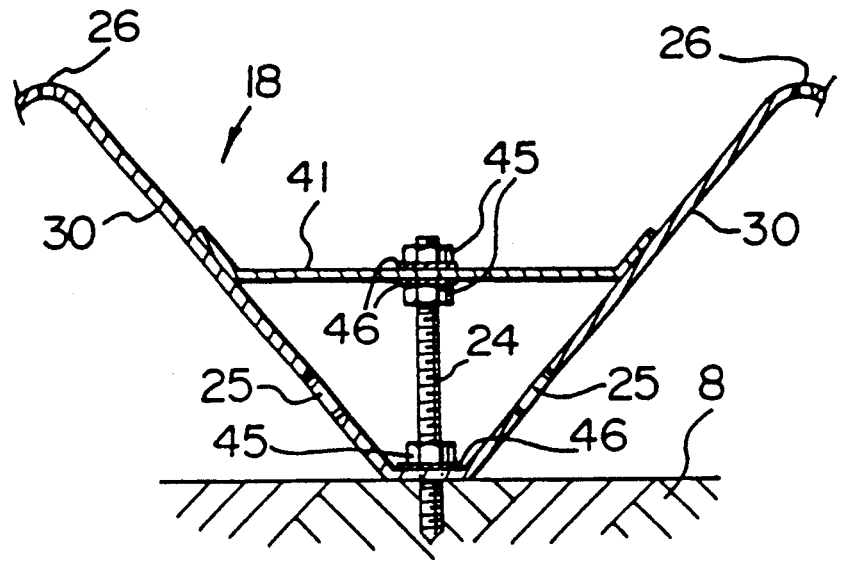
FIG. 8 is a cross section of a trough in the filter elements of FIGS. 3 and 4.
Figure 9:
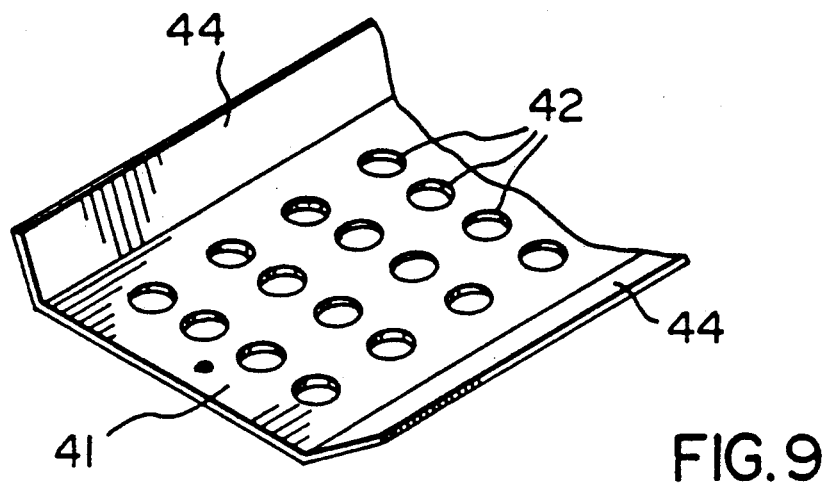
FIGS. 9, 10 and 11 are perspective views of sections of grids used in the apparatus of FIG. 1.
Figure 10:
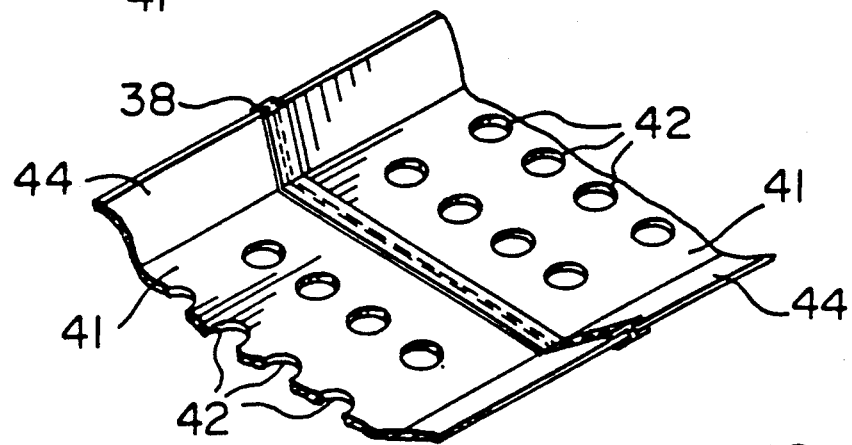

As shown in FIG. 8, anchor bolts 24 extend through the grid 41, nuts 45, washers 46 and the bases 31 or flanges 33 of the elements 18 into the floor 8 of the basin 6. When sections of grid 41 are to be joined end-to-end, a strip 38 of H-shaped cross section is used (FIG. 10). When the grid 41 is to be used with fine sand or another fine filter media, screens 47 are provided over the openings 42 and a cover plate 48 is mounted on the grid to sandwich the screens 47 in position. Bolt holes 49 are provided near the side edges of the grid 41 and of the cover plate 48 for securely connecting the elements to each other. Openings 50 similar in size to the grid openings 42 are provided in the cover plate 48. The openings 50 are aligned with the openings 42.

Figure 13:
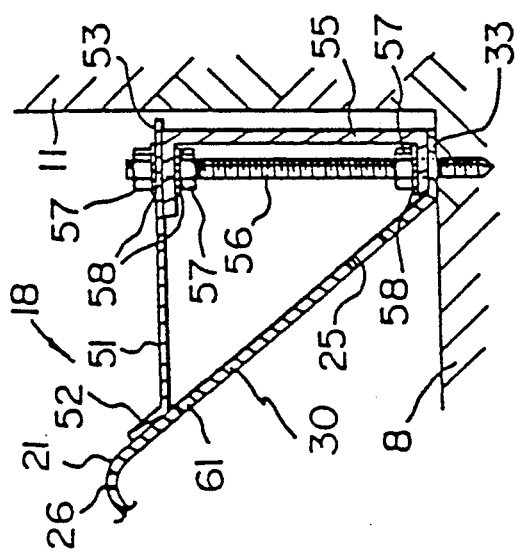
FIG. 13 is a cross section of one side of a filter element in accordance with the present invention.

The half troughs forms by the sides of the filter elements 18 and the side 9 of the basin 6 or the partition 11, are closed by a grid 51 (FIGS. 1 and 13). The grid 51 has one inclined side edge 52 for engaging the side 30 of the element 18. The other edge 53 is supported in the horizontal position by a generally C-shaped channel member 55. An anchor bolt 56 extends through the member 55, and through nuts 57, washer 58 and the flange 33 of the element 18 into the bottom slab 8 of the basin 6.

Figure 12:
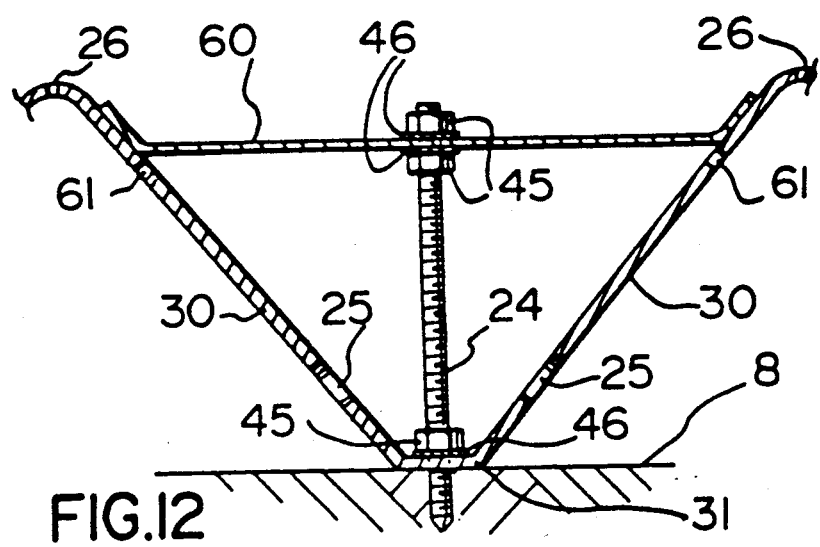
FIG. 12 is a cross-sectional view of an alternate form of a grid used in the apparatus of the present invention.

In cases where the filter media 1 is to be cleaned by water backwash only, i.e. without a preliminary air scour, or air addition simultaneous with water backwash, the grids 41 and 51 are mounted at approximately the middle of the sides 30 of each arch 21 or trough (FIGS. 8 and 13). As shown in FIG. 12, when air scour is to be used prior to or simultaneous with backwashing of the filter media 1, a wider grid 60 is mounted near the top of the arches and troughs so that the air holes 61 are under the grid. Of course a wider half grid (not shown) similar to the grid 51 is provided at the sides of the elements 18.

Figure 14:
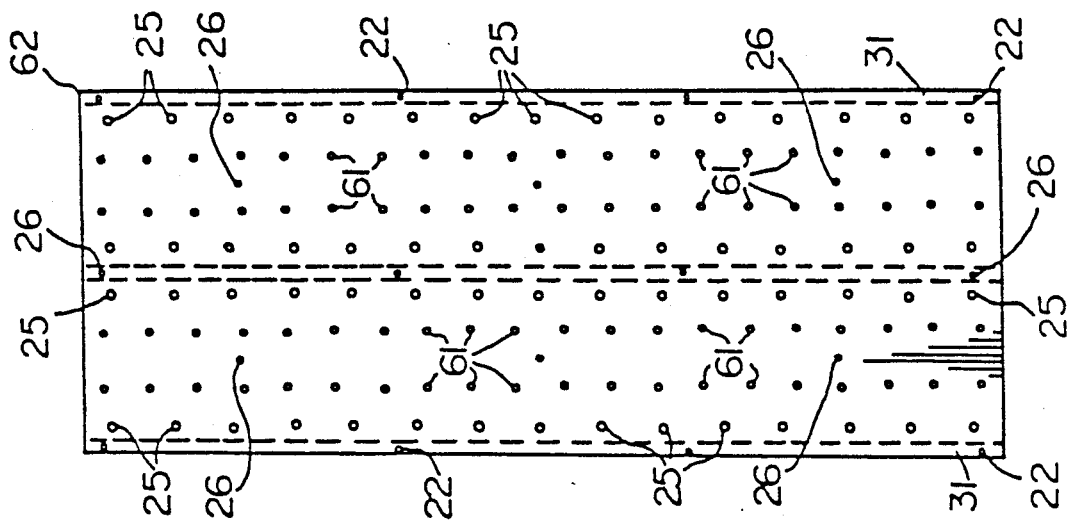
FIGS. 14 and 15 are plan views of two additional forms of panels or plates used to form filter elements in the present invention.
Figure 15:
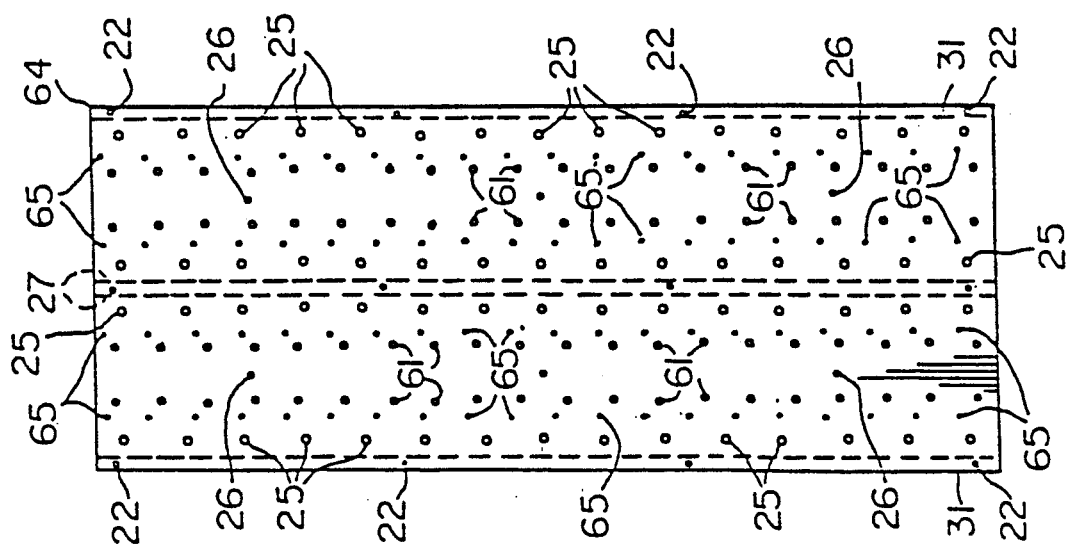

As shown in FIG. 14, additional air distribution openings 61 can be provided in a plate 62 used to form a filter element. Such openings 61 are in parallel longitudinal rows above the water inlet and outlet openings 25 on each side 30 of the arches 21 formed using the plate 62. This type of structure is preferred in the air scour mode.

Another embodiment of the invention (FIGS. 15 and 17) for use when the media is subjected to simultaneous air and water backflushing includes a sheet 64 which incorporates the lower water openings 25, air outlet openings 26 and 61, and the bolt holes 65 for receiving bolts 67 (FIGS. 16 and 17) which are used to mount a horizontal partition 68 beneath each arch when the sheet 64 is bent to form two adjacent arches with a trough therebetween. Neoprene or similar elastomeric sealing strips 69 are provided between the ends of the partition 68 and the sides 30 of the arches. The partition 68 divides the interior of the arch into a lower water passage 70 and an upper air passage 71. Air is introduced into the passage 71 via an inlet tube 72, a header 73 (FIG. 16) in the flume 15 and a pipe 75 extending through the wall of the basin 6 to a source of air under pressure air (not shown). The tube 72 is surrounded by a sleeve 76, which extends downwardly from the partition 68 to receive the top end of the tube 72.

Figure 17:
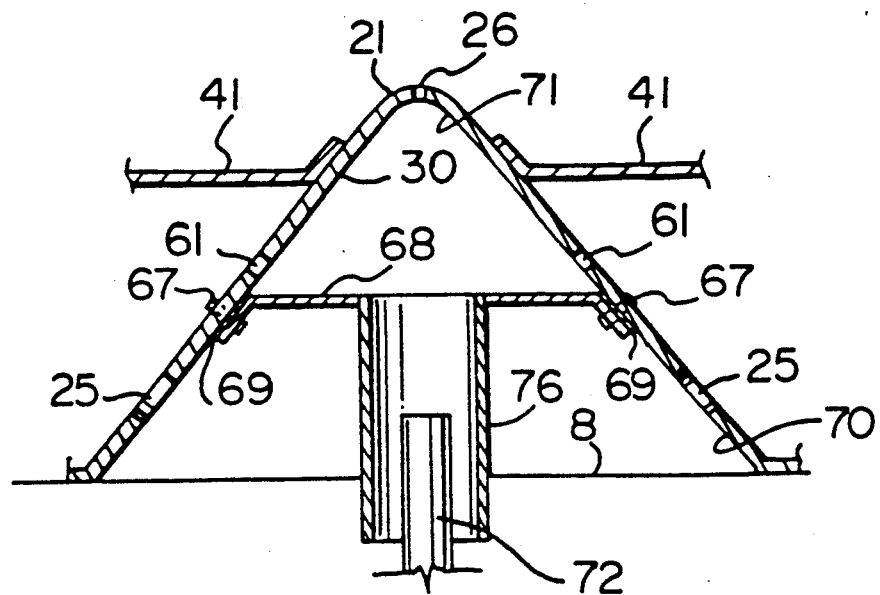
FIG. 17 is a cross section of a portion of the filter apparatus of FIG. 16.
Figure 18:
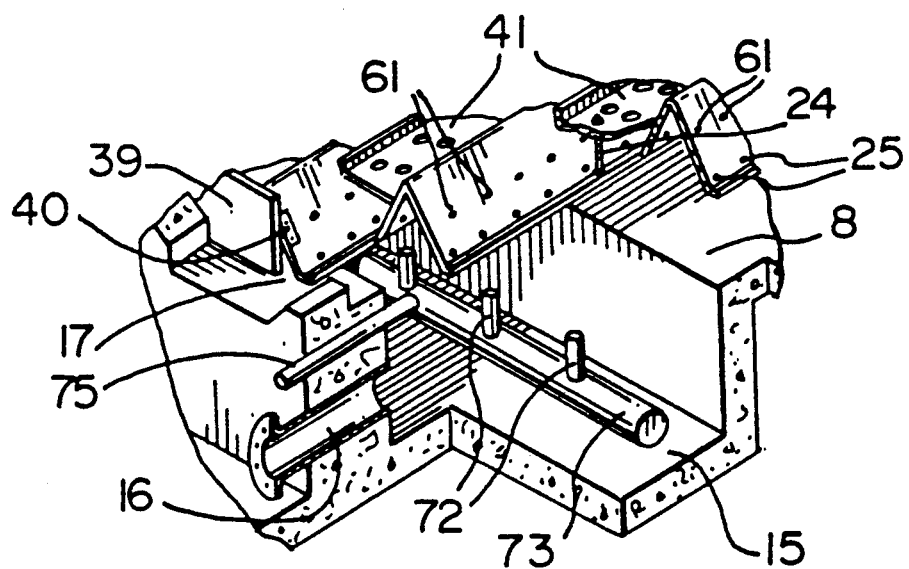
FIG. 18 is a perspective view from above of yet another embodiment of the filter apparatus of the present invention.

FIG. 18 shows the type of air introduction system used when air scour not simultaneous with backwash is used. In this case there are no division plates such as plate 68 of FIG. 17 or downwardly extending sleeves such as sleeve 76 of FIG. 17-76.

Figure 16:
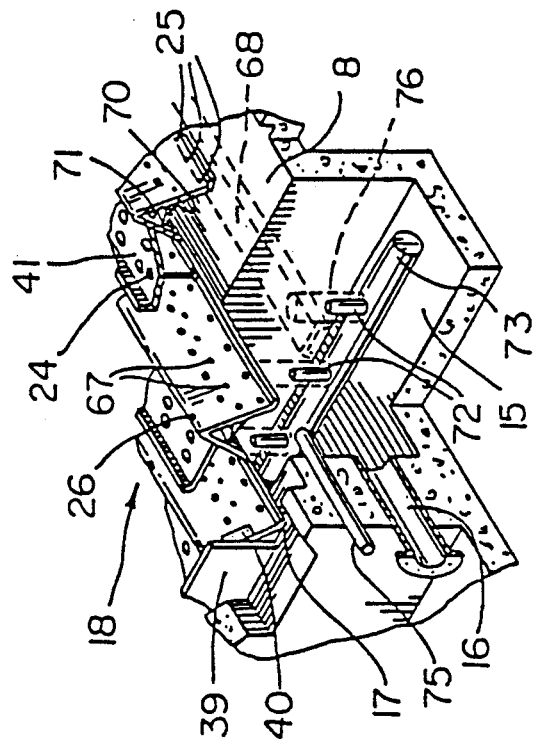
FIG. 16 is a perspective view of a section of another embodiment of the filter apparatus of the present invention.

The inlet tubes 72, closed ended header 73, air inlet 75 are identical in both FIGS. 16 and 18. Such inlet tubes 72 are open at their bottom ends and extend downwardly into the header 73. Openings 83 of FIG. 19 for controlled metering of air are provided in the sides of each tube 72.

Figure 19:
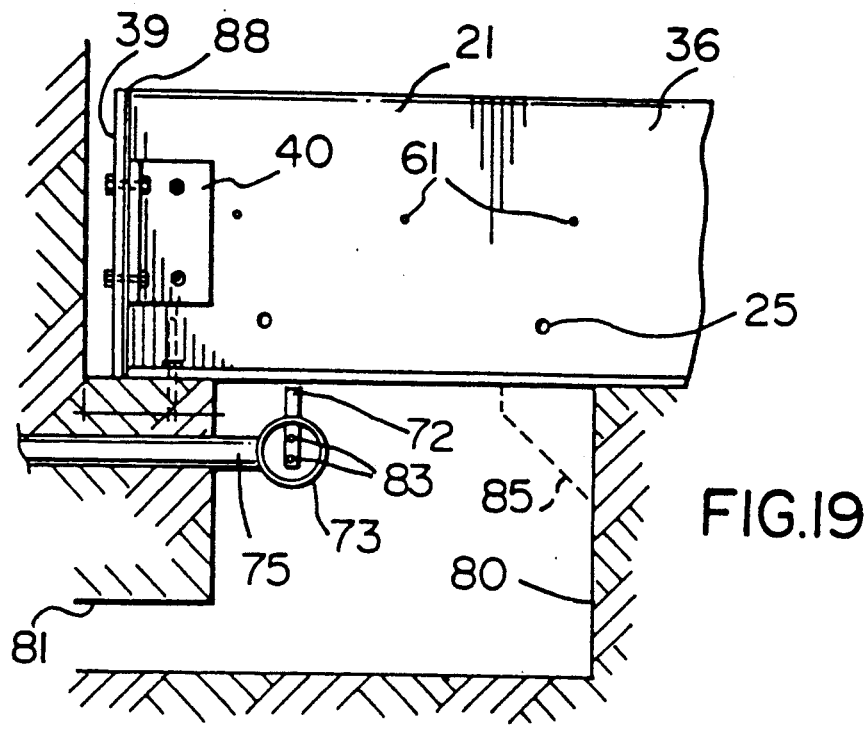
FIG. 19 is a partly sectioned, side elevational view of a portion of the apparatus of FIG. 18.

In the embodiment of FIG. 19, optional shoulder 85 is shown to extend into the flume 80 from the inner side thereof.

Figure 20:
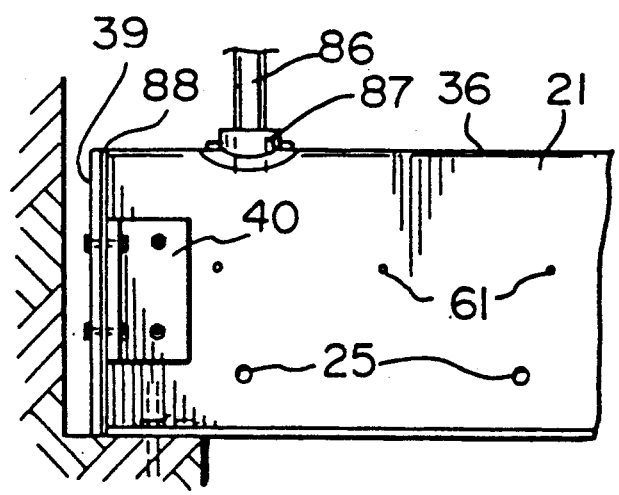
FIG. 20 is a side elevational view of one end of a filter element incorporating a different form of air inlet.

With reference to FIG. 20, another form of air inlet includes a top inlet tube 86, which is connected to the top end of the arch 21 by an internally threaded connector 87, which is welded or bolted to the top of the arch near one end 39 thereof.

FIGS. 21 to 26 show embodiments of grids 90 intended to replace the grids 41, 60 and 51. The grids 90 of FIGS. 21 to 26 are not mounted in the trough areas of the apparatus but span the arches transversely. Larger grid sections can be used with this embodiment with cost savings in larger filters in fabrication and installation. The problem of protecting the air vent holes 26 from fine media ingress by individual air vent hole screening is eliminated, because the vent holes are beneath the grids. The air vent holes 26 are punched slightly spaced from the arch 30 apex so the holes are not blocked by the top grid.

Figure 21:
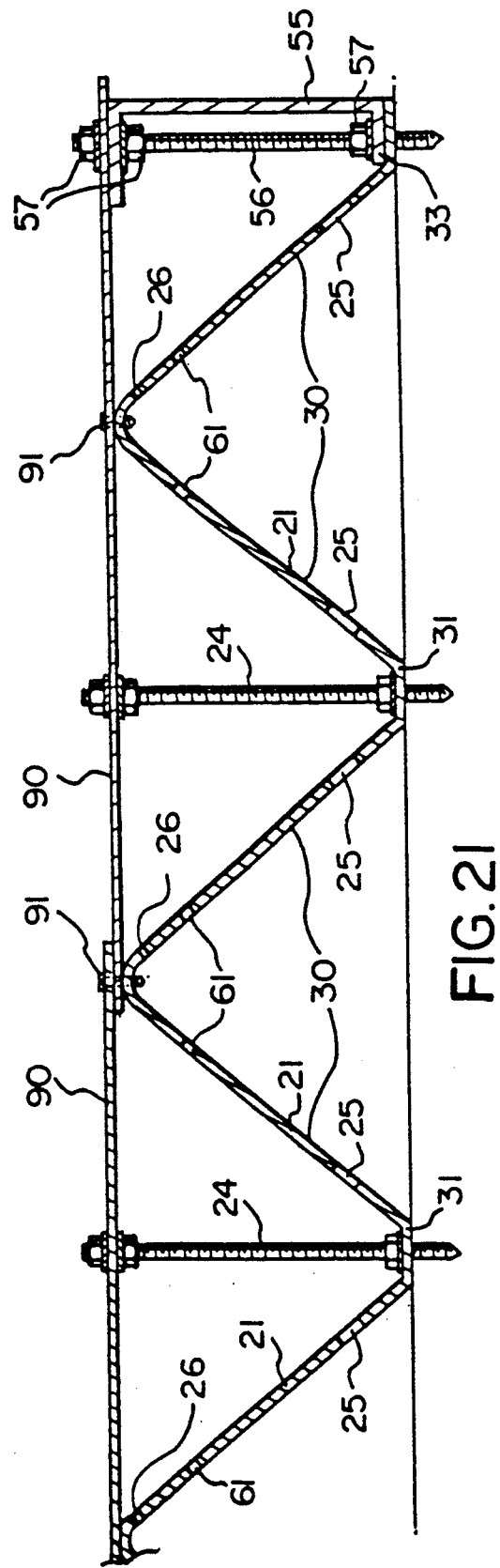
FIG. 21 is a schematic, cross-sectional view of a portion of another embodiment of the filter element of the present invention incorporating gravel or fine media restraining grids.

FIG. 21 shows the transverse spanning position of the grids 90 in this embodiment of the invention. The grids 90 are held in position by extended anchor bolts 24. At the sides, the grid ends are fastened to the side edge channel member 55 by anchor bolts 56. The member 55 and the anchor bolts 56 are lengthened to conform with the horizontal spanning position of the grid. The grid ends are overlapped over an arch apex and fastened at that point with self tapping screws 91. The anchor bolts 24 support the grid 90. However, self tapping screws at the apex of each or some of the arches spanned is workable with support elements as necessary to eliminate anchor bolt extensions.

Figure 22:
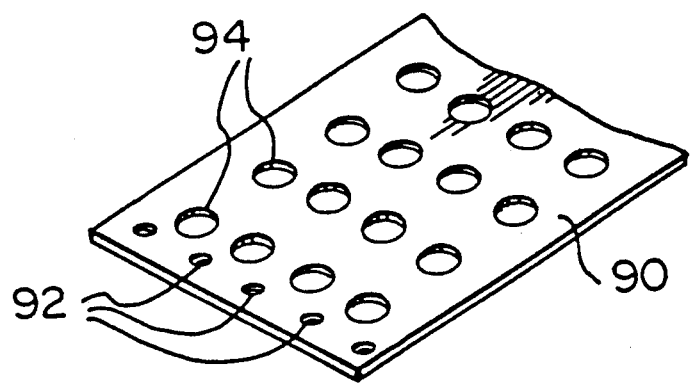
FIGS. 22 and 23 are perspective views of two types of grids.
Figure 23:
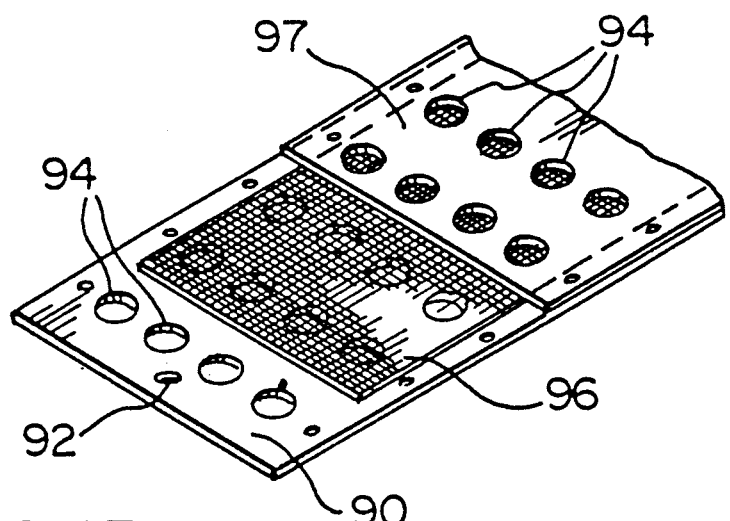

As best shown in FIG. 22, a perforated grid 90 for supporting graded gravel with fine media above such gravel is provided in lengths and widths to suit. Slots 92 are punched longitudinally with slots 93 (FIG. 24) of the overlapping adjoining grid punched transversely for ease of matching and installing self tapping screws. Circular openings 94 similar to the openings 42 (FIG. 9) are provided in the grid 90.

Figure 11:
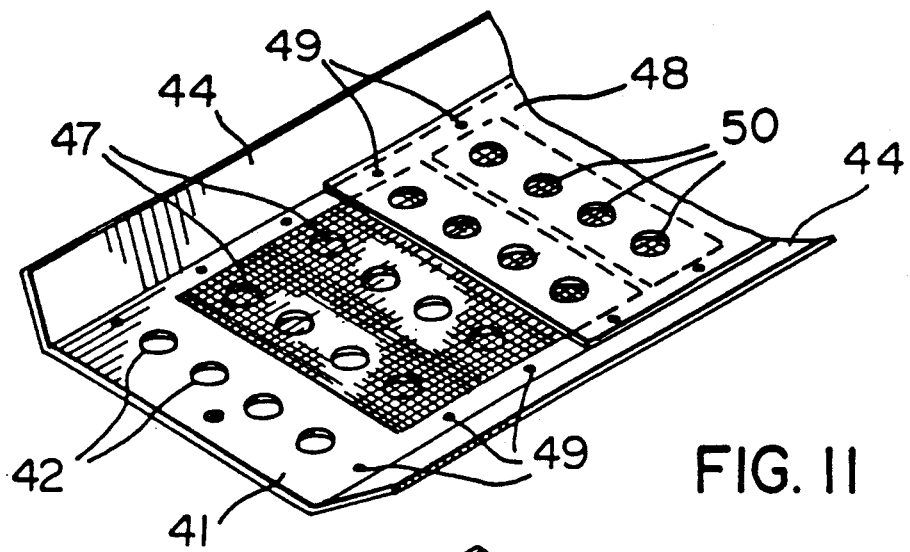

A laminated perforated structure similar to that of FIG. 11 includes stainless steel mesh 96 sandwiched between grids 90 and 97 to act as a retainer for fine media with no necessity for gravel barrier layering.

There are numerous ways of constructing grids including the use of flat profile wire (wedge wire) sheets.

Figure 24:
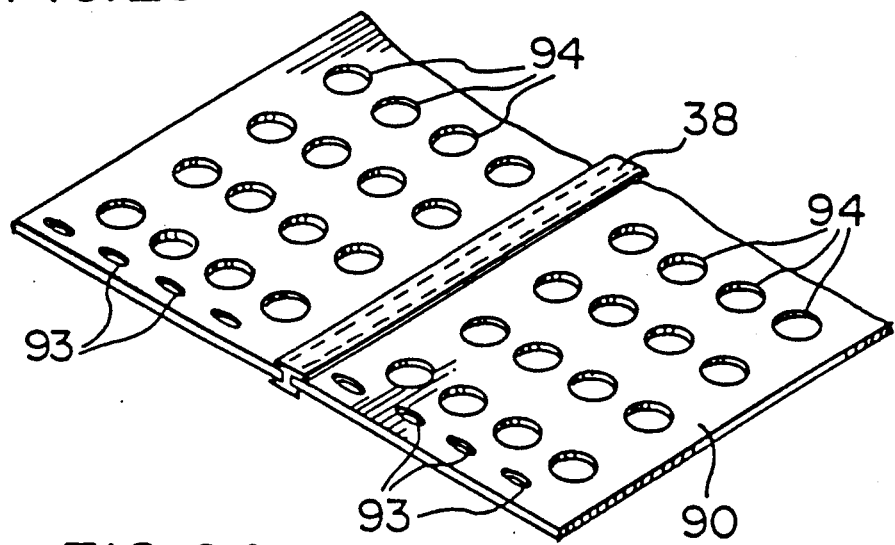
FIG. 24 is a perspective view of portions of two grids and a seal.

Referring to FIG. 24, the edges of adjacent grids 90 are interconnected by I-shaped seal strips 38 of neoprene or other elastomer. Sealing the grid 90 where it rests on side channel members 55 or where ends overlap is not normally necessary, although such sealing could readily be accomplished using strips of neoprene or another elastomer.

Figure 26:
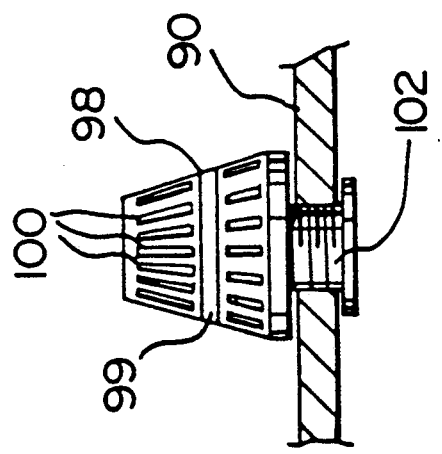
FIG. 26 is a cross section of a strainer used in the grid of FIG. 25.
Figure 25:
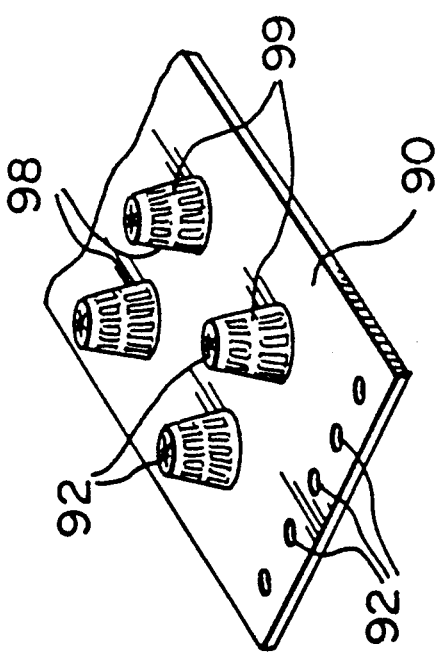
FIG. 25 is a perspective view of another embodiment of the grid using strainers as media retainers.

As best shown in FIGS. 25 and 26, strainers 98 can be used on the grid 90 to act as fine media retainers. Each strainer 98 includes a frusto-conical body 99 with slots 100 therein, and a threaded bottom end 102 for mounting the strainer in the grid 90. During normal use of the basic apparatus practicing water backwash only (FIGS. 1 to 4), water is filtered through the media 1, the arches 21 and the grids 41, flowing into the flume 15 for discharge through the pipe 16. Periodically, the flow of water is reversed to backwash the media. Backwash water and impurities dislodged from the media 1 overflow into the troughs 14 for discharge via the gullet 13.

When backwashing operations involving a preliminary air scour and water backflush or a combination air scour and water backflush are desirable modes it is necessary to use the apparatuses of FIGS. 14 to 20 for such procedures. During air scouring, water is drained to beneath the trough level 14, and air is introduced through the pipe 75, the header 73 and the tubes 72 into the arches 21. The use of the header 73 and metering tube 72 ensures uniform distribution of the air (which may be another gas; however, for the sake of simplicity the term "air" is used throughout this case) to the individual arch shaped conduits. By varying the number and size of the air openings 26 for approximately 3"-4" of water head loss uniform distribution of air from conduits 21 to all parts of the media 1 is assured.

In the air scour mode, air is introduced to bubble through the media 1 to cause vigorous agitation of the media to loosen material adhering thereto. Air scour is performed for a variety of periods of time, typically three-five minutes. The airflow is then stopped and, after a delay of a few minutes to permit air release from the media 1, backwash flow is initiated as in an ordinary hydraulic backwash.

When operating with long arches 21, it may be necessary to stagger the air openings 61, or to provide additional holes. Custom designs of the air openings compensates for filter floors which are not dead level, and assists in proper air distribution in long conduits where wave action results due to the velocity of the air over water surface. Concerning the surface of the bottom wall 8 of the basin 6, normal construction tolerance on concrete filter floors is $\frac{1}{8}$" for ten feet of length. When operating in an air scour mode the floor level is much more critical than when using a water backflush only. When normal construction tolerance has not been achieved, a concrete floor or bottom wall 8 can be made dead level using self-levelling grout. It is preferable when using a preliminary air scour to provide a dead level floor in the basin 6 by grouting rather than compensating by changing the openings 61.

A preferred solution to the problem of achieving uniform air distribution when wave action is a problem for example in two phase flow in long arches is to provide a horizontal partition 68 (FIGS. 16 and 17) which divides each arch 21 into a lower water passage 70 and an upper passage 71. These wave action problems are completely eliminated. The air division plates or partitions 68 add considerable structural stiffening to the underdrain apparatus. Moreover, the requirement for dead level floor is also eliminated.

During a simultaneous air scour/water backwashing operation, air or another gas is bubbled through the media 1 while water flows therethrough. The water flow rate is too low to cause fluidization of the media 1, but is sufficiently high to sweep out dirt loosened by the air agitation of the media. In dual media or multi-media filters, it is necessary to increase the backwash rate sufficient to cause fluidization, on completion of backwashing, to restratify the media. When effecting a simultaneous air scour/water backwash operation in long arches 21, there is a marked tendency to generate severe wave action. The wave action can be so severe that some of the water openings 25 pass air, and some of the air openings 26 and/or 61 pass water. Thus the distribution of air and water is very poor. The preferred solution to the problem of wave action is to provide the horizontal partition 68 (FIGS. 16 and 17), which divides each arch 21 into a lower water passage 70 and an upper air passage 71.

Further embodiments of the invention relating to inlet flumes (see FIG. 1, flume 15) will now be considered. FIG. 1 shows a front flume design, though other configurations are common, for example:

trough flume or pipe-in-trough or embedded pipe running the length of the filter down the centre line or along the inner side. The troughs and conduits of the underdrain apparatus run across the width of the filter.

trough flume or pipe-in-trough or embedded pipe running across the center width of the filter with such trough flume receiving backwash flow or discharging filtered water via an embedded pipe through the side or via an embedded pipe through the end of the filter. The troughs and conduits of the underdrain apparatus run the length of the filter.

on occasion the conduits of the apparatus may be fed via a side or end pipe or conduit through wall sleeves connecting to the ends of the conduits.

circular filters with across the diameter inlet/outlet trough flume or pipe-in-trough or embedded pipe, with the underdrain apparatus conduits running transversely to such trough flume or pipe.

The underdrain apparatus is compatible with and readily adaptable to any of these (and other) modes of backwash introduction/filtered water outlet.

It is readily apparent, however, from previous discussion of velocity/momentum considerations in the conduits of the apparatus that maldistribution from the flume or pipes introducing backwash water into the conduits of the apparatus is important to consider.

Figure 27:
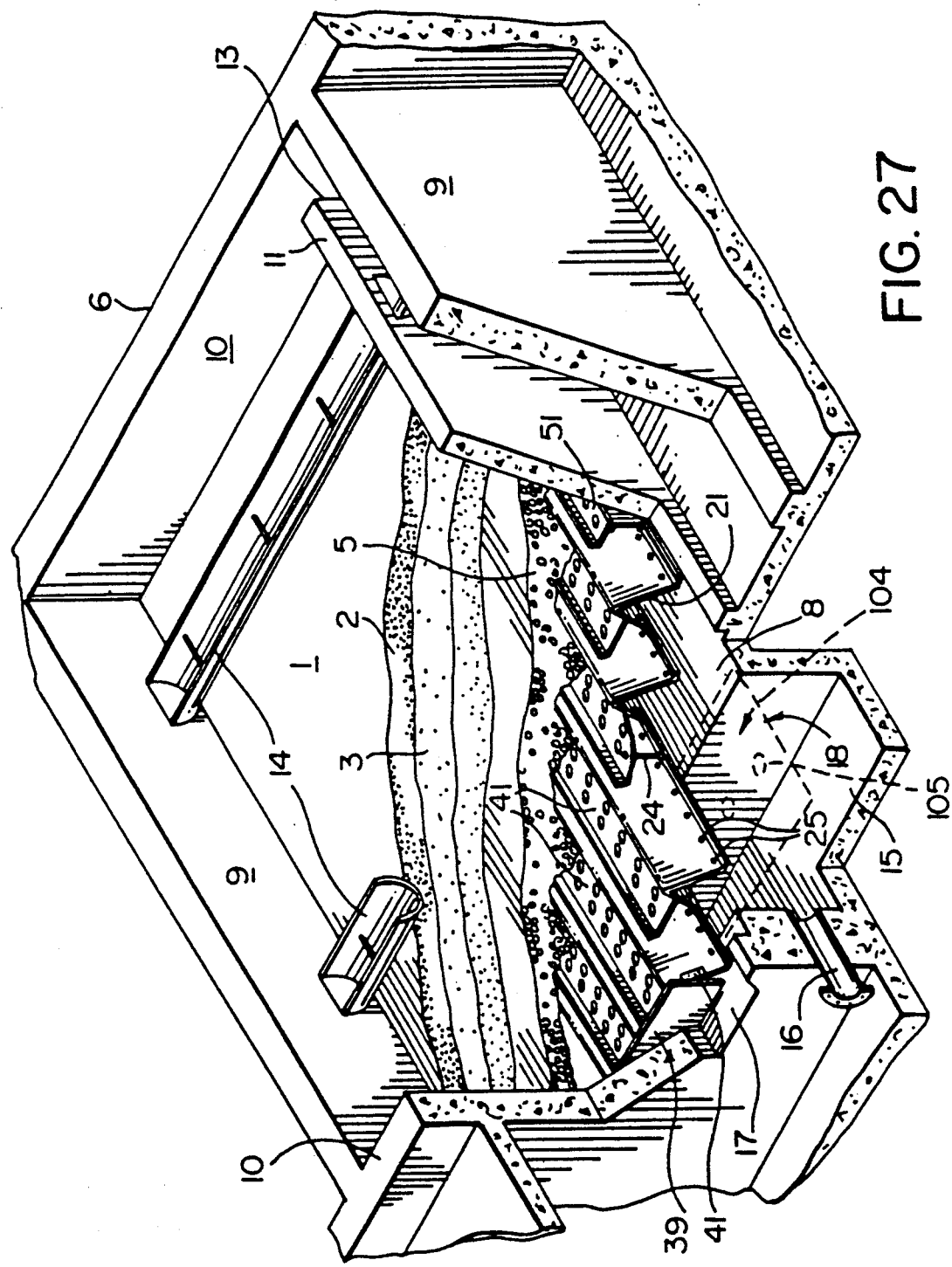
FIG. 27 is a view similar to FIG. 1 showing an inlet flume maldistribution corrector plate.

On any of the sunken concrete flumes in any configuration the provision, as part of the underdrain, of stainless steel flume cover plates, with orifices sized using the same hydraulic calculation method as for orifices 25 in the conduits of the underdrain ensures an evenly distributed flow of backwash water into each conduit section. FIG. 27 shows such a cover plate 104 having such sized orifices 105 therein to introduce backwash water into each conduit section. Similar cover plates for any flume configuration are proposed.

Figure 29:
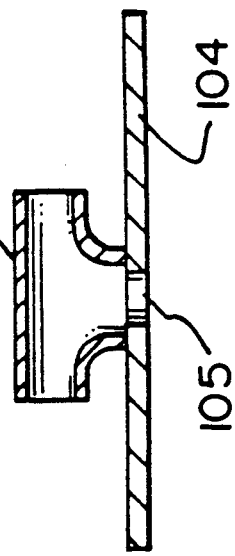
FIGS. 28 and 29 which appear on the second last sheet of drawings, are sections of the plate of FIG. 27, showing a pair of anti-turbulence, flow director devices.
Figure 28:
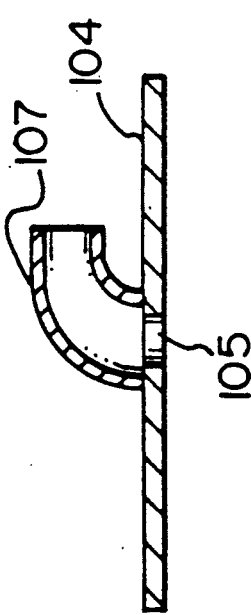

In this connection, it will be appreciated that the flume can extend beneath the center of the arch structure 105. As shown in FIG. 28, one form of flow director includes a 90° elbow 107 where the introduction of backwash water is at the bottom end of the conduits, or a tee 108 (FIG. 29) where such introduction is mid way of a conduit.

On pipe-in-trough type of backwash-in/filtered water out systems orifices would be drilled in the top of the pipe, such orifices located under each conduit section. These orifices are sized using the same hydraulic calculation method as for orifices 25 in the conduits of the underdrain, to ensure even flow distribution from the pipe into each conduit section. Again flow director devices 107 and 108 of FIGS. 28 and 29 may be desirable to eliminate turbulence.

On embedded pipe much the same procedure would be used. Varied orifices would be provided in the pipe with welded-on riser pipes upward to the top of the concrete bottom slab. These risers would all be the same diameter, i.e. slightly larger than the largest orifice hole. Flow director devices 107 and 108 may be desirable on the risers to eliminate turbulence.

Where the underdrain conduits are fed through their end via an external conduit or pipe with wall sleeves, the same hydraulic treatment would be used to vary orifice sizes in such pipe with the sleeves all the same size, or to calculate plate orifice size variation for wall sleeves from a concrete flume.

In this case, the term "proximate" is intended to mean at or near.

What I claim is:

1. A filter underdrain apparatus comprising plate means of generally V-shaped cross sections, a plurality of said plate means being assembled in juxtaposed relationship to define alternating V-shaped troughs and inverted V-shaped arches, perforate grid means for extending across each trough proximate the top thereof between adjacent arches for supporting filter media; a first row of air vent holes extending longitudinally of said plate means proximate the top of said arches, a row of water inlet/outlet means extending longitudinally of said plate means beneath said grid means proximate the bottom of each side of each said arch, and partition means in each said arch between said air vent holes and said water inlet/outlet, said partition means dividing the interior of the arch into a lower water passage and an upper air passage.

2. A filter underdrain apparatus according to claim 1, including a row of air scour vent holes extending longitudinally of said plate means beneath said grid means on each side of each said arch, and above said row of water inlet/outlet means.

3. An apparatus according to claim 2, including header means for receiving air from a source of air under pressure; and inlet tube means for introducing and metering air from said header means into each of said arches.

4. An apparatus according to claim 1, including header means for receiving air from a source of air under pressure; and inlet tube means for introducing air from said header means into each said upper air passage.

5. An apparatus according to claim 4, wherein said inlet tube means includes an inlet tube extending upwardly from said header means, and a sleeve coaxial with said inlet tube and extending downwardly from said partition means into overlapping relationship with said inlet tube for receiving air therefrom.

6. An apparatus according to claim 1, including inlet tube means in the top of each said arch for introducing air into said upper air passage.

7. An apparatus according to claim 1, including basin means for receiving said plate means and said grid means, said basin means including side wall means, end wall means, and bottom wall means.

8. An apparatus according to claim 7, including flume means extending transversely of said basin means at one end of said bottom wall means, said plate means extending longitudinally of said basin means, whereby one end of each said arch and each said grid means overlies said flume means.

9. An apparatus according to claim 8, including header means in said flume means for receiving air from a source of air under pressure; and inlet tube means connected to said header means for introducing air from said header means into each of said arches.

10. A filter underdrain apparatus comprising plate means shaped and configured to form a plurality of horizontal distributor conduits, said conduits being in juxtaposed, laterally-spaced relationship and constructed and arranged to define alternating conduits and troughs of a filter underdrain, at least some of said horizontal distributor conduits including interior partition means extending along such conduits and dividing the interior of each such conduit into a liquid passage and a gas passage, means defining liquid metering orifices communicating the interior of the liquid passage with the exterior of the distributor conduit for substantially evenly distributing backwash liquid flows from the liquid passage and for passing filtered liquid flows into the liquid passage, and means defining gas metering orifices communicating the interior of the gas passage with the exterior of the distributor conduit for substantially evenly distributing gas from the gas passage when connected with a pressurized gas source.

11. A filter underdrain apparatus as claimed in claim 10 wherein in each conduit said gas passage is above said liquid passage, said gas metering orifices are above said partition means, and said liquid metering orifices are below said partition means.

12. A filter underdrain apparatus as claimed in claim 10 wherein said plate means form generally upstanding sidewalls of said distribution conduits, said liquid and gas metering orifices are in said side walls, and said partition means extends between the side walls of a conduit and separates the liquid metering orifices from the gas metering orifices in each side wall.

13. A filter underdrain apparatus as claimed in claim 12 wherein said side walls of each distribution conduit taper outwardly and downwardly.

14. A filter underdrain apparatus as claimed in claim 10 including header means for receiving gas from a source of gas under pressure, and inlet tube means for introducing gas from said header means into said gas passage.

15. A filter underdrain apparatus as claimed in claim 14 wherein said inlet tube means includes an inlet tube extending upwardly from said header means, and a sleeve coaxial with said inlet tube and extending downwardly from said partition means into overlapping relationship with said inlet tube for receiving gas therefrom and passing the gas into said gas passage.

16. A filter underdrain apparatus as claimed in claim 10 further comprising screen means for screening said liquid and gas orifices from filter media exterior of said distributor conduits.

17. A filter underdrain apparatus as claimed in claim 16 wherein said screen means comprises perforate grid means.

18. A filter underdrain apparatus as claimed in claim 17 wherein said perforate grid means extends across the trough between adjacent distributor conduits.

* * * * *